US011935459B2

(12) United States Patent
Yang et al.

(10) Patent No.: US 11,935,459 B2
(45) **Date of Patent: *Mar. 19, 2024**

(54) DISPLAY APPARATUS

(71) Applicant: LG Display Co., Ltd., Seoul (KR)

(72) Inventors: KeyYoung Yang, Paju-si (KR); Jihoon Yu, Paju-si (KR); Bumhee Han, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,819

(22) Filed: Nov. 1, 2022

(65) Prior Publication Data

US 2023/0059695 A1 Feb. 23, 2023

Related U.S. Application Data

(63) Continuation of application No. 17/119,018, filed on Dec. 11, 2020, now Pat. No. 11,495,164.

(30) Foreign Application Priority Data

Dec. 24, 2019 (KR) ........................ 10-2019-0174315

(51) Int. Cl.
*G09G 3/3266* (2016.01)
*G09G 3/20* (2006.01)

(52) U.S. Cl.
CPC ... *G09G 3/2092* (2013.01); *G09G 2300/0413* (2013.01); *G09G 2320/0238* (2013.01)

(58) Field of Classification Search
CPC ......... G09G 3/2092; G09G 2300/0413; G09G 2320/0238; G09G 2310/0286; G09G 3/3266; G09G 3/3677; G09G 2310/0251; G09G 2310/061; G09G 2310/08; G09G 2340/0435; G09G 3/2018; G09G 2310/06;

(Continued)

(56) References Cited

U.S. PATENT DOCUMENTS

| | | | | |
|---|---|---|---|---|
| 11,495,164 | B2 * | 11/2022 | Yang .................... | G09G 3/3266 |
| 2008/0238854 | A1 * | 10/2008 | Kimura ................ | G09G 3/3648 345/98 |

(Continued)

FOREIGN PATENT DOCUMENTS

| | | |
|---|---|---|
| KR | 10-2007-0068767 A | 7/2007 |
| KR | 10-2017-0104689 A | 9/2017 |

(Continued)

*Primary Examiner* — Jose R Soto Lopez
(74) *Attorney, Agent, or Firm* — Birch, Stewart, Kolasch & Birch, LLP

(57) ABSTRACT

A display apparatus can include a display panel configured to display a black image and a real image, a gate driver configured to display gate signals to a plurality of gate lines provided in a display area of the display panel, and a controller configured to control the gate driver. Here, one-frame period for displaying the black image is shorter than one-frame period where the real image is displayed. Further, the gate driver can include a plurality of stages configured to supply the gate signals to the plurality of gate lines, and a plurality of dummy stages connected directly between the plurality of stages and the controller. In addition, gate start signals for driving the plurality of stages are supplied to the plurality of dummy stages by the controller.

17 Claims, 9 Drawing Sheets

(58) Field of Classification Search
CPC ........... G09G 2340/04; G09G 2340/08; G09G 2340/16
See application file for complete search history.

(56) References Cited

U.S. PATENT DOCUMENTS

2008/0238897 A1* 10/2008 Kimura .................... G09G 3/36 345/204
2009/0009463 A1* 1/2009 Tanaka ................. G09G 3/3648 345/101
2009/0109247 A1* 4/2009 Kimura ................ G09G 3/3688 345/690
2009/0115772 A1* 5/2009 Shiomi ................ G09G 3/3688 345/89
2009/0160845 A1* 6/2009 Jang ..................... G09G 3/3677 345/87
2009/0243995 A1* 10/2009 Kimura .................. G09G 3/342 345/102
2009/0273556 A1* 11/2009 Shimoshikiryoh .. G09G 3/3611 345/99
2010/0091006 A1* 4/2010 Yoo ...................... G09G 3/3233 345/213
2010/0156858 A1* 6/2010 Moon .................... G11C 19/28 345/204
2011/0090320 A1* 4/2011 Tsuchida ................ G02B 30/24 348/51
2012/0249518 A1* 10/2012 Won ..................... H04N 13/356 345/213
2013/0002736 A1* 1/2013 Park ..................... G09G 3/3225 345/691
2013/0082999 A1* 4/2013 Ahn ..................... H04N 13/398 345/212
2015/0002504 A1* 1/2015 Jo ........................ G09G 3/3677 345/99
2015/0194121 A1* 7/2015 Lee ...................... G09G 3/3677 345/212
2016/0063919 A1* 3/2016 Ha ........................ G06F 3/0346 345/76
2017/0206837 A1* 7/2017 Jeon ..................... G09G 3/3225
2017/0236483 A1* 8/2017 Guo ....................... G09G 3/003 345/691
2017/0301301 A1* 10/2017 Pan ...................... G09G 3/3618
2018/0061293 A1* 3/2018 Park ....................... G09G 3/006
2018/0190222 A1* 7/2018 Wang ................... G09G 3/3648
2018/0274974 A1* 9/2018 Wang ....................... G09G 3/20
2019/0025648 A1* 1/2019 Wu ...................... G09G 3/2074
2019/0051246 A1* 2/2019 Kim ..................... G09G 3/3258
2019/0189060 A1* 6/2019 Takasugi .............. G09G 3/3275
2019/0392760 A1* 12/2019 Zeng .................... G09G 3/3266
2020/0152128 A1* 5/2020 Kim ..................... G09G 3/3266
2020/0160781 A1* 5/2020 Park ..................... G09G 3/3266
2020/0273417 A1* 8/2020 Zhao .................... G09G 3/3614
2021/0020091 A1* 1/2021 Cao .......................... G09G 3/20
2021/0043132 A1* 2/2021 Nam .................... G09G 3/3233
2021/0065621 A1* 3/2021 Lee ...................... G09G 3/3426

FOREIGN PATENT DOCUMENTS

KR 10-2019-0016858 A 2/2019
KR 10-2019-0051411 A 5/2019

* cited by examiner ( a )

( b )

DISPLAY APPARATUS

CROSS-REFERENCE TO RELATED APPLICATIONS

This application is a Continuation application of U.S. patent application Ser. No. 17/119,018 filed on Dec. 11, 2020 (U.S. Pat. No. 11,495,164 issued on Nov. 8, 2022), which claims the priority benefit of the Korean Patent Application No. 10-2019-0174315 filed in the Republic of Korea on Dec. 24, 2019, the entire contents of all these applications are hereby expressly incorporated by reference as if fully set forth herein into the present application.

BACKGROUND

Field of the Invention

The present disclosure relates to various kinds of display apparatuses.

Discussion of the Related Art

Display apparatuses include liquid crystal display (LCD) apparatuses and light emitting display apparatuses.

In display apparatuses, in order to realize a high resolution and to implement high-speed driving, a number of images should be displayed in a certain period, and thus, a one-horizontal period (1H) where a data voltage is supplied to a pixel should be very short.

However, when a one-horizontal period (1H) is shortened, a period where a data voltage is charged into a pixel is shortened, and due to this, the pixel is difficult to normally emit light corresponding to the data voltage.

Therefore, a one-horizontal period (1H) is not infinitely shortened, and due to this, it is difficult to implement a display apparatus which realizes a high resolution and is driven at a high speed.

SUMMARY OF THE DISCLOSURE

Accordingly, the present disclosure is directed to providing various kinds of display apparatuses that substantially obviate one or more problems due to limitations and disadvantages of the related art.

An aspect of the present disclosure is directed to providing a display apparatus in which a black image is provided between real images and one frame period for displaying the black image is set to be shorter than one frame period where each of the real images is displayed.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other advantages and in accordance with the purpose of the disclosure, as embodied and broadly described herein, there is provided a display apparatus including a display panel displaying a black image and a real image, a gate driver supplying gate signals to a plurality of gate lines provided in a display area of the display panel, and a controller controlling a function of the gate driver, wherein a one-frame period for displaying the black image is shorter than a one-frame period where the real image is displayed.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
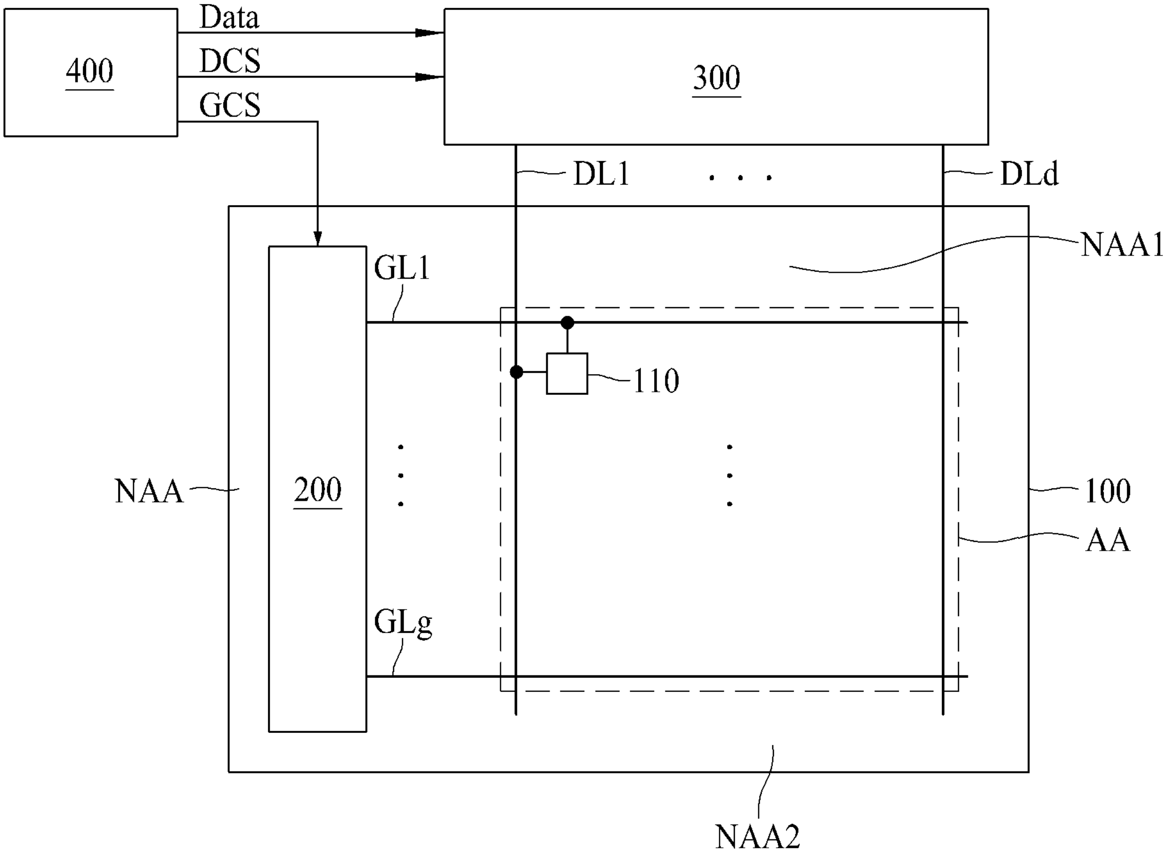
FIG. 1 is an exemplary diagram illustrating a configuration of a display apparatus according to one or more embodiments of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part can be added unless 'only-' is used. The terms of a singular form can include plural forms unless referred to the contrary.

In construing an element, the element is construed as including an error range although there is no explicit description.

In describing a position relationship, for example, when a position relation between two parts is described as 'on-', 'over-', 'under-', and 'next-', one or more other parts can be disposed between the two parts unless 'just' or 'direct' is used.

In describing a time relationship, for example, when the temporal order is described as 'after-', 'subsequent-', 'next-', and 'before-', a case which is not continuous can be included unless 'just' or 'direct' is used.

It will be understood that, although the terms "first", "second", etc. can be used herein to describe various elements, these elements should not be limited by these terms. These terms are only used to distinguish one element from another and may not define any order. For example, a first element could be termed a second element, and, similarly, a second element could be termed a first element, without departing from the scope of the present disclosure.

In describing the elements of the present disclosure, terms such as first, second, A, B, (a), (b), etc., can be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers can be present. Also, it should be understood that when one element is disposed on or under another element, this can denote a case where the elements are disposed to directly contact each other, but can denote that the elements are disposed without directly contacting each other.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings.

Figure 2:
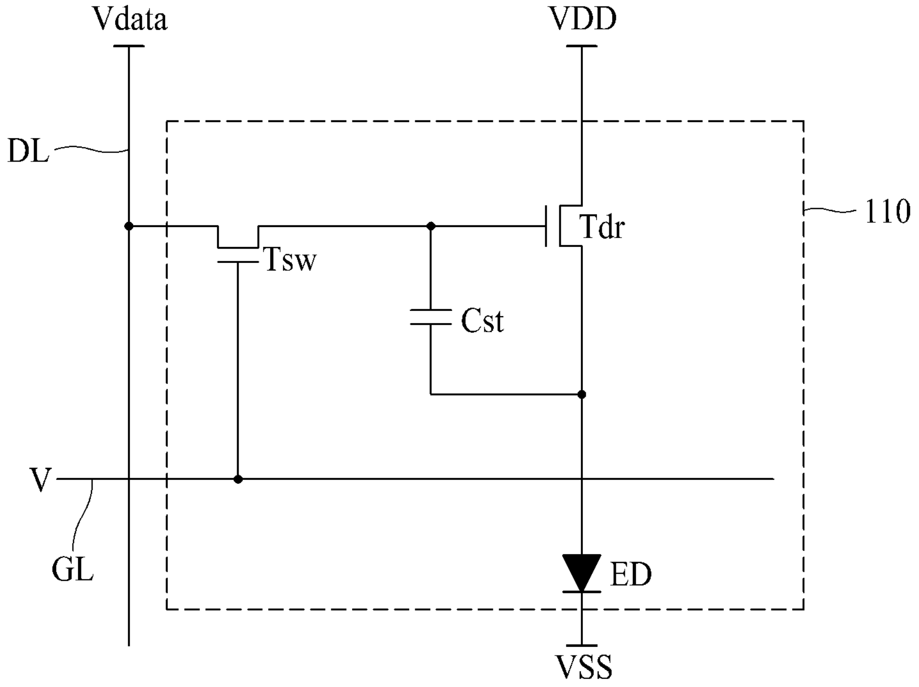
FIG. 2 is an exemplary diagram illustrating a structure of a pixel applied to a display apparatus according to the present disclosure.
Figure 2:
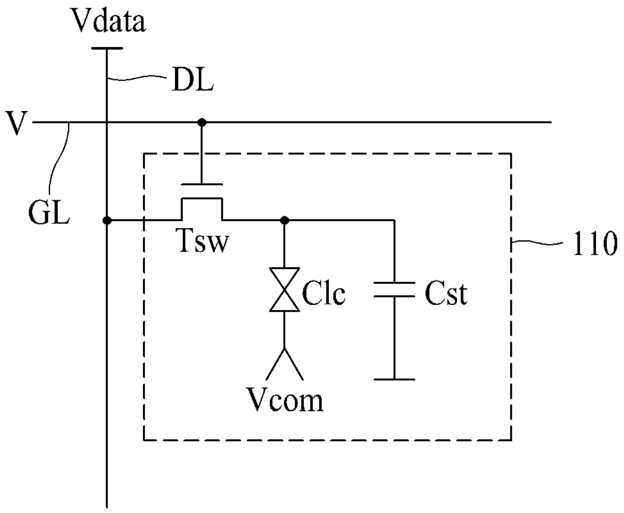

FIG. 1 is an exemplary diagram illustrating a configuration of a display apparatus according to one or more embodiments of the present disclosure, and FIG. 2 is an exemplary diagram illustrating a structure of a pixel applied to a display apparatus according to the present disclosure. At least one or each pixel in FIG. 1 can have the pixel structure of FIG. 2.

The display apparatus according to one or more embodiments of the present disclosure can configure various kinds of electronic devices. Examples of the electronic devices can include smartphones, tablet personal computers (PCs), televisions (TVs), monitors, navigation devices, smart devices, wearable electronic devices, etc.

The display apparatus according to the present disclosure, as illustrated in FIG. 1, can include a display panel 100 which includes a display area AA for displaying a black image and a real image and a non-display area NAA provided outside the display area AA, a gate driver 200 which supplies a gate signal to a plurality of gate lines GL1 to GLg provided in the display area AA of the display panel 100, a data driver 300 which respectively supplies data voltages to a plurality of data lines DL1 to DLd provided in the display panel 100, and a controller 400 which controls driving of the gate driver 200 and the data driver 300. Here, g (e.g., in GLg) and d (e.g., in DLd) can be positive numbers such as positive integers. In this case, one frame period for displaying the black image can be set to be shorter than one frame period where the real image is displayed.

In the following description, the real image can denote an image corresponding to each of pieces of input video data transmitted from an external system. The black image can denote an image inserted between real images by the display apparatus, and the image can display black.

One frame period can denote a period for displaying a real image or a period for displaying one black image. The one frame period can denote a display period for actually displaying a real image (or a black image) and a blank period where any image is not displayed between a period for displaying a real image (or a black image) is displayed and a period for displaying a black image (or a real image). For example, the one frame period can include the display period and the blank period. That any image is not displayed in the display period can denote that data voltages for implementing a real image or a black image are not transferred to the data lines in the blank period. For example, the one frame period can denote a time.

In the following description, a first frame and a second frame can denote the order of one frame periods. For example, the second frame can start after the first frame, and each of the first frame and the second frame can be maintained during one frame period.

Particularly, in the following description, the first frame can denote one frame period where a real image is displayed, and the second frame can denote one frame period where a black image is displayed.

The display panel 100 can include the display area AA and the non-display area NAA.

The gate lines GL1 to GLg can be provided in the display area AA. The gate lines GL1 to GLg can be electrically connected to the pixels 110 provided in the display area AA, for displaying the black image or the real image.

In the non-display area NAA (for example, the display panel 100 illustrated in FIG. 1), a plurality of dummy gate lines can be further provided in a first non-display area AA1 provided at an upper end of a first gate line GL1 and a second non-display area AA2 provided at a lower end of a $g^{th}$ gate line GLg. The dummy gate lines may not be connected to the pixels 110, and a black image or a real image may not be displayed by gate signals supplied to the dummy gate lines.

The dummy gate lines can be electrically connected to a plurality of dummy pixels which are provided in the first non-display area AA1 and the second non-display area AA2. A black image or a real image may not be displayed by the dummy pixels.

The display panel 100 can be a light emitting display panel including a light emitting device, or can be a liquid crystal display panel which displays an image by using a liquid crystal.

When the display panel 100 is the light emitting display panel, as illustrated in (a) of FIG. 2, the pixel 110 included in the display panel 100 can include a light emitting device ED, a switching transistor Tsw, a capacitor Cst, and a driving transistor Tdr.

The light emitting device ED can include one of an organic light emitting layer, an inorganic light emitting layer, and a quantum dot light emitting layer, or can include a stacked or combination structure of an organic light emitting layer (or an inorganic light emitting layer) and a quantum dot light emitting layer.

When the display panel 100 is the liquid crystal display panel, as illustrated in (b) of FIG. 2, the pixel 110 included in the display panel 100 can include a switching transistor Tsw, a common electrode Vcom, a liquid crystal, and a capacitor Cst.

When the display panel 100 is the liquid crystal display panel, the display apparatus can further include a backlight which irradiates light onto the liquid crystal display panel.

In the display panel 100, a pixel area where each of the pixels 110 is provided can be defined therein, and a plurality of signal lines for transferring a driving signal to a pixel driving circuit included in the pixel 110 can be provided therein.

The signal lines can include various kinds of lines, in addition to the gate lines GL1 to GLg and the data lines DL1 to DLd.

The data driver 300 can be mounted on a chip-on film (COF) attached on the display panel 100. The COF can be connected to a main board with the controller 400 mounted thereon. In this case, the COF can include a plurality of lines which electrically connect the controller 400, the data driver 300, and the display panel 100, and to this end, the lines can be electrically connected to the main board and a plurality of pads included in the display panel 100. The main board can be electrically connected to an external board with the external system mounted thereon. The data driver 300 can be directly mounted on the display panel 100 and can be electrically connected to the main board.

However, the data driver 300 can be implemented as one integrated circuit (IC) along with the controller 400, and the IC can be mounted on the COF or can be directly mounted on the display panel 100.

The external system can perform a function of driving the controller 400 and the electronic device. For example, when the electronic device is a smartphone, the external system can transmit or receive various pieces of sound information, image information, and letter information over a wireless communication network and can transmit image information to the controller 400. The image information can include the input video data.

Hereinafter, a configuration and a function of the controller 400 will be described with reference to FIGS. 3 to 5.

The gate driver 200 can be configured as an IC, and then, can be mounted in the non-display area NAA or can be directly embedded into the non-display area NAA by using a gate-in panel (GIP) type.

Hereinafter, a configuration and a function of the gate driver 200 will be described with reference to FIG. 6.

Figure 3:
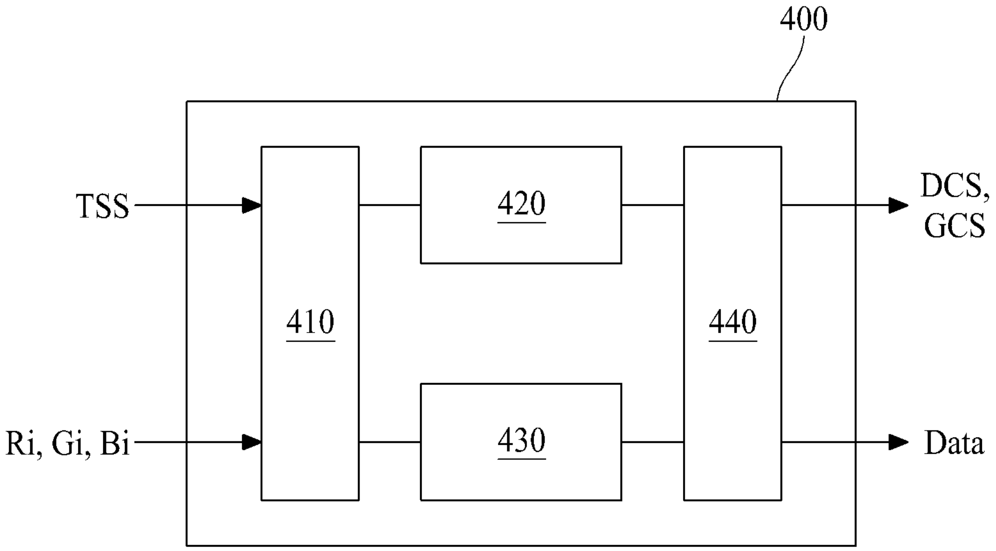
FIG. 3 is an exemplary diagram illustrating a configuration of a controller applied to a display apparatus according to the present disclosure.
Figure 4:
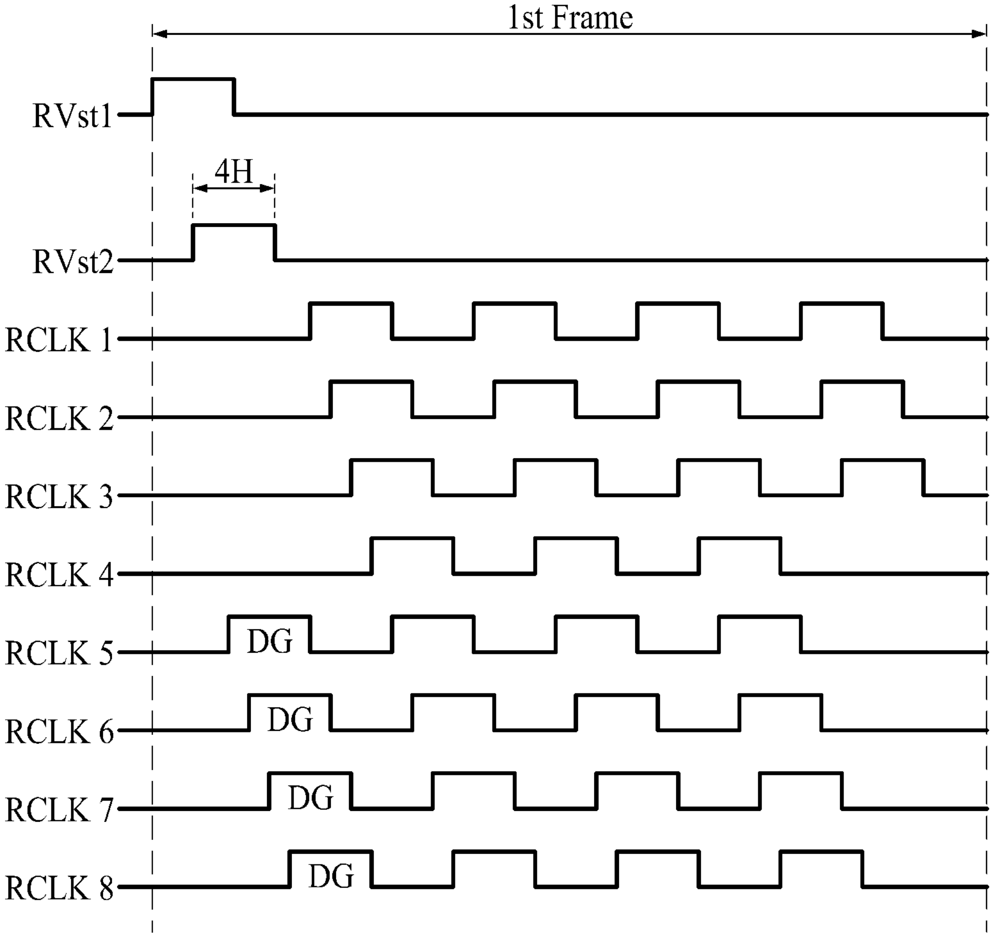
FIG. 4 is an exemplary diagram illustrating a real gate control signal applied to a display apparatus according to the present disclosure.
Figure 5:
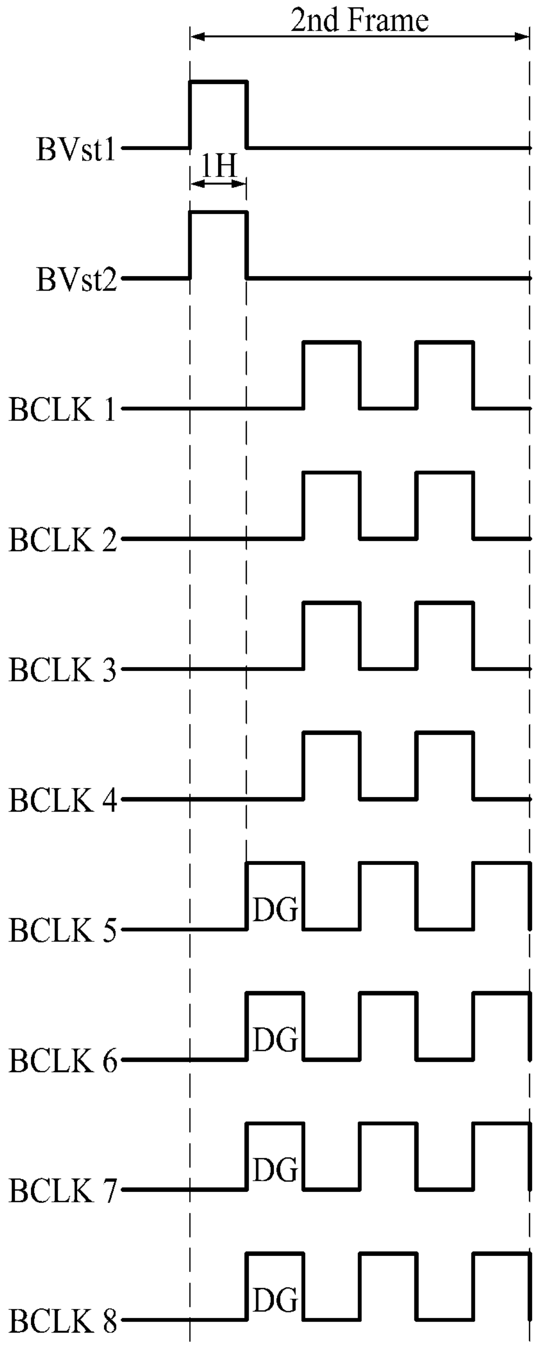
FIG. 5 is an exemplary diagram illustrating a black gate control signal applied to a display apparatus according to the present disclosure.

FIG. 3 is an exemplary diagram illustrating a configuration of a controller applied to a display apparatus according to the present disclosure, FIG. 4 is an exemplary diagram illustrating a real gate control signal applied to a display apparatus according to the present disclosure, and FIG. 5 is an exemplary diagram illustrating a black gate control signal applied to a display apparatus according to the present disclosure.

The controller 400, as illustrated in FIG. 3, a data aligner 430 which realigns pieces of input video data Ri, Gi, and Bi transferred from an external system on the basis of a timing synchronization signal TSS transferred from the external system to supply pieces of realigned image data Data to the data driver 300, a control signal generator 420 which generates a gate control signal GCS and a data control signal DCS on the basis of the timing synchronization signal TSS, an input unit 410 which receives the timing synchronization signal TSS and the input video data Ri, Gi, and Bi transferred from the external system and respectively transfers the input video data Ri, Gi, and Bi and the timing synchronization signal TSS to the data aligner 430 and the control signal generator 420, and an output unit 440 which outputs the image data Data generated by the data aligner 430 and the data control signal DCS generated by the control signal generator 420 to the data driver 300 and outputs the gate control signal GCS to the gate driver 200.

The controller 400 can divide one frame period by using a vertical synchronization signal included in the timing synchronization signal TSS, and thus, can divide the first frame and the second frame.

In the present disclosure, one frame period for displaying a black image can be set to be shorter than one frame period where a real image is displayed.

The control signal generator 420 can generate a real gate control signal shown in FIG. 4 and can transfer the real gate control signal to the gate driver 200, in the first frame where the real image is displayed.

For example, the real gate control signal can be output to the gate driver 200 in the first frame, and the real image can be displayed based on the real gate control signal.

The control signal generator 420 can generate a black gate control signal shown in FIG. 5 and can transfer the black gate control signal to the gate driver 200, in the second frame where the black image is displayed.

For example, the black gate control signal can be output to the gate driver 200 in the second frame, and the black image can be displayed based on the black gate control signal.

Features of the real gate control signal and the black gate control signal will be described below.

First, as shown in FIG. 4, the real gate control signal can include a first real gate start signal RVst1, a second real gate start signal RVst2, and eight real gate clocks RCLK1 to RCLK8 having different phases.

The black gate control signal, as shown in FIG. 5, can include a first black gate start signal BVst1, a second black gate start signal BVst2, four black gate clocks BCLK1 to BCLK4 having a first phase, and four black gate clocks BCLK5 to BCLK8 having a second phase which differs from the first phase.

Hereinafter, a display apparatus using eight real gate clocks RCLK1 to RCLK8 and eight black gate clocks BCLK1 to BCLK8 will be described as an example of the present disclosure. However, the present disclosure is not limited thereto. Therefore, a display apparatus according to the present disclosure can be configured with a number of real gate clocks and a number of block gate clocks.

A width of a real gate clock included in the real gate control signal can be greater than that of a black gate clock included in the black gate control signal. The real gate clock can denote one of the eight real gate clocks RCLK1 to RCLK8, and the black gate clock can denote one of the eight black gate clocks BCLK1 to BCLK8.

For example, as shown in FIG. 4, a width of the real gate clock can correspond to a four-horizontal period 4H, and as shown in FIG. 5, a width of the black gate clock can correspond to a one-horizontal period 1H.

Here, the one-horizontal period 1H can denote a period where data voltages generated by the data driver 300 are supplied to pixels corresponding to one gate line.

The four-horizontal period 1H can denote a period corresponding to four times the one-horizontal period 1H.

For example, while one real gate clock is being transferred to the gate driver 200, four black gate clocks can be transferred to the gate driver 200.

However, a width of the real gate clock and a width of the black gate clock are not limited to a range described above.

For example, when the display apparatus according to the present disclosure is driven based on 2 m (where m is a natural number) phases, a width of the real gate clock can correspond to m/2-horizontal to m-horizontal periods (m/2) H to mH. In this case, a width of the black gate clock can be equal to or greater than an m/4-horizontal period and can be less than that of the real gate clock.

As a detailed example, as shown in FIG. 4, when the display apparatus according to the present disclosure is driven based on eight phases, m can be four. Therefore, a width of the real gate clock can correspond to one of two-horizontal to four-horizontal periods 2H to 4H. In this case, a width of the black gate clock can be one of values which are equal to or greater than a one-horizontal period 1H and are less than a width of the real gate clock.

Hereinafter, a display apparatus where a width of the real gate clock corresponds to a four-horizontal period 4H and a width of the black gate clock corresponds to a one-horizontal period 1H will be described with reference to FIGS. 1 to 9 as an example of the present disclosure.

Therefore, the present disclosure can be applied to various display apparatuses driven based on 2 m phases, and for example, can be applied to monitors, TVs, tablet personal computers (PCs), smartphones, etc.

A width of each of the first real gate start signal RVst1 and the second real gate start signal RVst2 can correspond to a four-horizontal period, and a width of each of the first black gate start signal BVst1 and the second black gate start signal BVst2 can correspond to a one-horizontal period.

To provide an additional description, a width of each of the first real gate start signal RVst1, the second real gate start signal RVst2, and the eight real gate clocks RCLK1 to RCLK8 included in the real gate control signal can correspond to a four-horizontal period 4H as shown in FIG. 4, and a width of each of the first black gate start signal BVst1, the second black gate start signal BVst2, and the eight black gate clocks BCLK1 to BCLK8 included in the black gate control signal can correspond to a one-horizontal period 1H as shown in FIG. 5.

However, the present disclosure is not limited thereto. For example, a width of each of the first black gate start signal BVst1, the second black gate start signal BVst2, and the eight black gate clocks BCLK1 to BCLK8 can be set to various levels to have a period which is greater than a one-horizontal period 1H.

Particularly, when a width of the real gate clock corresponds to a four-horizontal period 4H, a width of each of the first black gate start signal BVst1, the second black gate start signal BVst2, and the eight black gate clocks BCLK1 to BCLK8 can be set to be equal to or greater than a one-horizontal period 1H or less than a four-horizontal period.

However, depending on the case, a width of each of the second black gate start signal BVst2 and the eight black gate clocks BCLK1 to BCLK8 can be set to be less than a one-horizontal period 1H.

As shown in FIG. 4, a phase of the first real gate start signal RVst1 can differ from that of the second real gate start signal RVst2.

However, as shown in FIG. 5, a phase of the first black gate start signal BVst1 can be the same as that of the second black gate start signal BVst2.

The eight real gate clocks RCLK1 to RCLK8, as shown in FIG. 4, can have different phases.

Four black gate clocks BCLK1 to BCLK4 of the eight black gate clocks BCLK1 to BCLK8 can have the same phase (for example, a first phase).

However, the other four black gate clocks BCLK5 to BCLK8 of the eight black gate clocks BCLK1 to BCLK8 can have the second phase which differs from the first phase.

As described above, the real gate control signal and the black gate control signal can be generated by the control signal generator 420.

When the first frame stars, the control signal generator 420 can output the real gate control signal to the gate driver 200, and when the second frame stars, the control signal generator 420 can output the black gate control signal to the gate driver 200.

Figure 6:
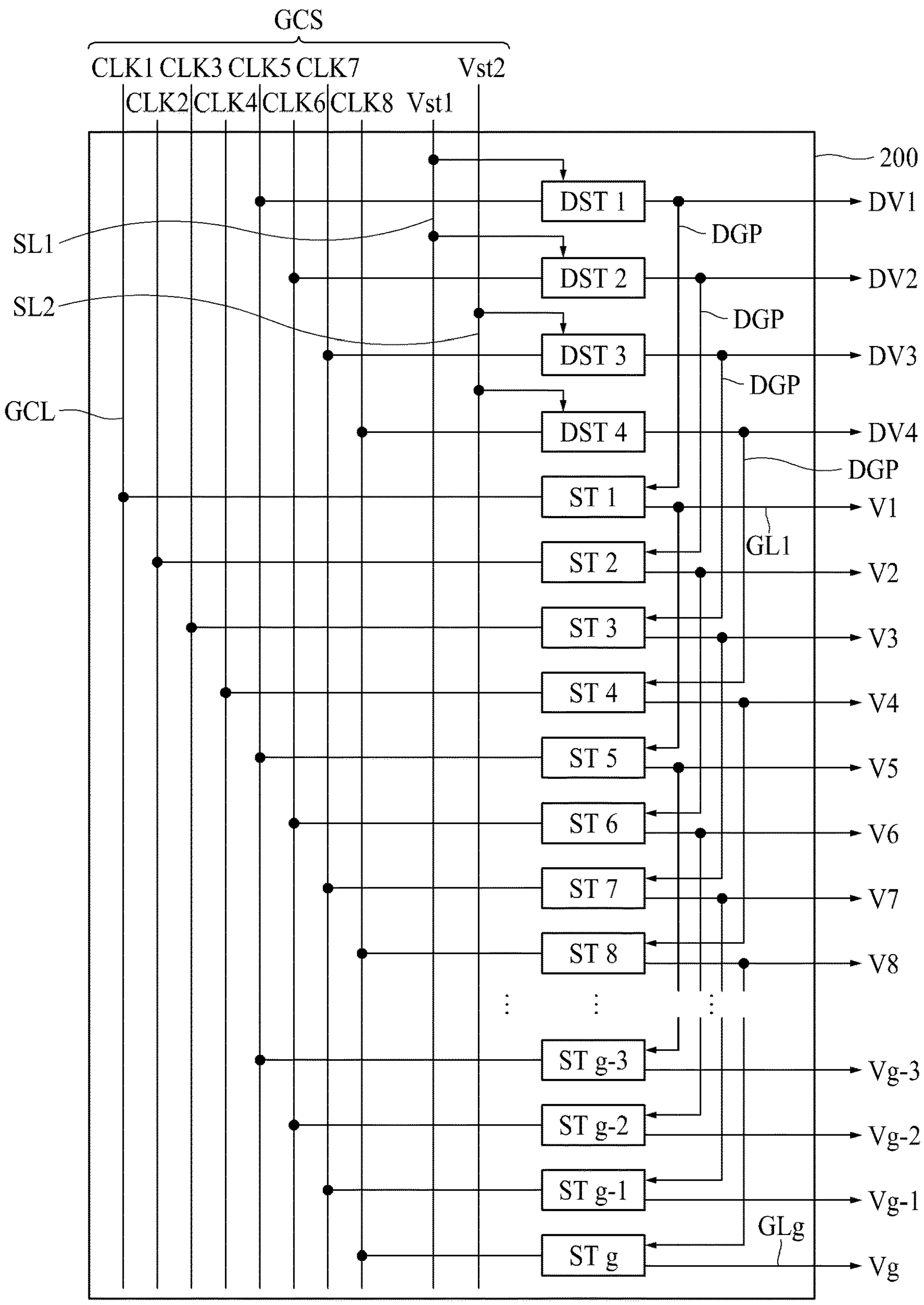
FIG. 6 is an exemplary diagram illustrating a configuration of a gate driver applied to a display apparatus according to the present disclosure.
Figure 7:
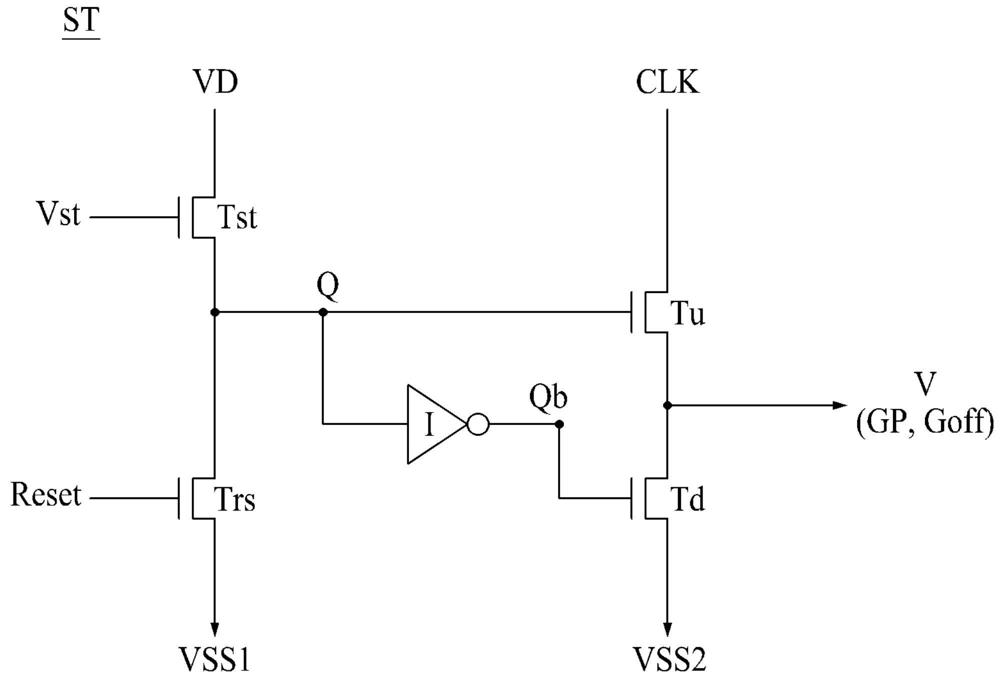
FIG. 7 is an exemplary diagram illustrating a basic configuration of each of stages illustrated in FIG. 6.

FIG. 6 is an exemplary diagram illustrating a configuration of a gate driver applied to a display apparatus according to the present disclosure, and FIG. 7 is an exemplary diagram illustrating a basic configuration of each of stages illustrated in FIG. 6.

The gate driver 200 can be implemented as an IC, and then, can be mounted in the non-display area NAA or can be embedded into the non-display area NAA by using a GIP type. When the GIP type is used, a plurality of transistors included in the gate driver 200 can be provided in the non-display area NAA through the same process as transistors included each of the pixels 110.

As described above, the real gate control signal and the black gate control signal can be supplied to the gate driver 200 by the controller 400 illustrated in FIG. 6. In the following description, the real gate control signal and the black gate control signal can be referred to as a gate control signal GCS. In this case, the real gate clocks RCLK1 to RCLK8 and the black gate clocks BCLK1 to BCLK8 described above with reference to FIG. 4 can be referred to as gate clocks CLK1 to CLK8, the first real gate start signal RVst1 and the first black gate start signal BVst1 can be referred to as a first gate start signal Vst1, and the second real gate start signal RVst2 and the second black gate start signal BVst2 can be referred to as a second gate start signal Vst2.

The gate driver 200, as illustrated in FIG. 6, can include a plurality of stages ST1 to STg which supply gate signals V1 to Vg to the gate lines GL1 to GLg connected to the pixels 110.

Each of the stages ST1 to STg can be connected to at least one gate line. In the following description, as illustrated in FIGS. 6 and 7, a stage connected to one gate line will be described below as an example of the present disclosure.

Each of the stages ST1 to STg can include a plurality of transistors. In FIG. 7, a stage ST including four N-type transistors Tst, Trs, Tu, and Td is illustrated as an example of the stages DST1 to DST4 and ST1 to STg illustrated in FIG. 6.

Hereinafter, first, a configuration and a function of the stage ST will be briefly described with reference to FIG. 7.

For example, the start transistor Tst can be turned on by the first real start signal RVst1, the second real start signal RVst2, the first black start signal BVst1, or the second black start signal BVst2 and can transfer a high voltage VD to a gate of a pull-up transistor Tu through a Q node Q.

The pull-up transistor Tu can be turned on by the high voltage VD, and the gate clock CLK can be output to a gate line GL through the pull-up transistor Tu. In this case, a gate pulse GP having a high value can be output to the gate line GL.

The high voltage VD passing through the start transistor Tst can be converted into a low voltage by an inverter I, and the low voltage can be supplied to a gate of a pull-down transistor Td through a Qb node Qb. Therefore, the pull-down transistor Td can be turned off.

When the start transistor Tst is turned off and a reset transistor Trs is turned on by a reset signal Reset, a first low voltage VSS1 can be supplied to the pull-up transistor Tu through the reset transistor Trs, and thus, the pull-up transistor Tu can be turned off.

The first low voltage VSS1 can be converted into a high voltage by the inverter I, and the high voltage can be supplied to the gate of the pull-down transistor Td through the Qb node Qb. Therefore, the pull-down transistor Td can be turned on. In this case, a second low voltage VSS2 can be supplied to the gate line GL through the pull-down transistor Td. The second low voltage VSS2 supplied to the gate line through the pull-down transistor Td can be a gate-off signal Goff.

When the gate pulse GP is supplied to a gate of the switching transistor Tsw included in the pixel 110, the switching transistor Tsw can be turned on, and thus, the pixel 110 can emit light. When the gate-off signal Goff is supplied to the switching transistor Tsw, the switching transistor Tsw can be turned off, and thus, the pixel 110 may not emit light or can emit black light. Accordingly, black can be displayed.

Each of the gate signals V1 to Vg output from the stage can include the gate pulse GP and the gate-off signal Goff.

When the gate pulse GP is output to the gate line GL, data voltages can be charged into the pixels 110 connected to the gate line GL. For example, when the gate pulse GP is supplied to the pixel 110 to turn on the switching transistor Tsw, a data voltage can be changed into the pixel 110 through the switching transistor Tsw.

Therefore, a width of the gate pulse GP can be a factor which determines a period where the data voltage is charged into the pixel 110.

The gate pulse GP, as illustrated in FIG. 7, can be generated by the gate clock CLK. Accordingly, a form of the gate clock CLK can be the same as that of the gate pulse GP.

Therefore, a width of the gate lock CLK can determine a width of the gate pulse GP, and thus, a width of the gate clock CLK can be a factor which determines a period where the data voltage is charged into the pixel 110.

The gate pulse GP can be transferred to another stage, and in this case, the gate pulse GP can perform a function of turning on the start transistor Tst.

A structure and a function of the stage ST can be variously changed in addition to the structure and the function described above with reference to FIG. 7. Therefore, the stage ST can further include a plurality of transistors in addition to the transistors Tst, Trs, Tu, and Td.

Second, a configuration and a function of the gate driver 200 including the stages ST1 to STg will be described below with reference to FIGS. 6 and 7.

The gate control signal GCS can be supplied to the gate driver 200 by the controller 400.

Particularly, in the first frame where a real image is displayed, the real gate control signal can be transferred to the gate driver 200.

The real gate control signal, as shown in FIG. 4, can include the first real gate start signal RVst1, the second real gate start signal RVst2, and the eight real gate clocks RCLK1 to RCLK8 having different phases.

In the second frame where a black image is displayed, the black gate control signal can be transferred to the gate driver 200.

The black gate control signal, as shown in FIG. 5, can include the first black gate start signal BVst1, the second black gate start signal BVst2, the four black gate clocks BCLK1 to BCLK4 having the first phase, and the four black gate clocks BCLK5 to BCLK8 having the second phase which differs from the first phase.

First, as illustrated in FIG. 6, the gate driver 200 can include a plurality of stages ST1 to STg which supply the gate signals V1 to Vg to the gate lines GL1 to GLg connected to the pixels 110.

Particularly, the gate driver 200 can include the plurality of stages ST1 to STg, which supply the gate signals V1 to Vg to the gate lines GL1 to GLg, and four dummy stages DST1 to DST4 which are not connected to the gate lines GL1 to GLg. Hereinafter, a display apparatus including the four dummy stages DST1 to DST4 will be described as an example of the present disclosure. However, the number of dummy stages can be set to various numbers in addition to four.

Gate start signals (for example, the first real gate start signal RVst1, the second real gate start signal RVst2, the first black gate start signal BVst1, and the second black gate start signal BVst2) for driving the stages ST1 to STg can be supplied to the four dummy stages DST1 to DST4.

To this end, as illustrated in FIG. 6, a first start line SL1 for transferring the first gate start signal Vst1 can be connected to a first dummy stage DST1 and a second dummy stage DST2, and a second start line SL2 for transferring the second gate start signal Vst2 can be connected to a third dummy stage DST3 and a fourth dummy stage DST4.

Therefore, in the first frame, the first real gate start signal RVst1 can be supplied to the first dummy stage DST1 and the second dummy stage DST2, and the second real gate start signal RVst2 can be supplied to the third dummy stage DST3 and the fourth dummy stage DST4.

In this case, as shown in FIG. 4, because a phase of the first real gate start signal RVst1 differs from that of the second real gate start signal RVst2, a timing at which the first real gate start signal RVst1 is supplied to the first dummy stage DST1 and the second dummy stage DST2 can differ from a timing at which the second real gate start signal RVst2 is supplied to the third dummy stage DST3 and the fourth dummy stage DST4.

Moreover, in the second frame, the first black gate start signal BVst1 can be supplied to the first dummy stage DST1 and the second dummy stage DST2, and the second black gate start signal BVst2 can be supplied to the third dummy stage DST3 and the fourth dummy stage DST4.

In this case, as shown in FIG. 5, because a phase of the first black gate start signal BVst1 is the same as from that of the second black gate start signal BVst2, the first black gate start signal BVst1 and the second black gate start signal BVst2 can be simultaneously supplied to the first to fourth dummy stages DST1 to DST4.

Gate clock lines GCL to which the eight gate clocks CLK1 to CLK8 are supplied, as illustrated in FIG. 6, can be sequentially connected to the stage ST. In the gate driver 200 illustrated in FIG. 6, gate clock lines to which fifth to eighth gate clocks CLK5 to CLK8 are supplied can be sequentially connected to the first to fourth dummy stages DST1 to DST4. Also, the gate clock lines GCL to which the first to eighth gate clocks CLK1 to CLK8 are supplied can be sequentially connected to the first to eighth stages ST1 to ST8, and such a connection structure can be identically applied to ninth to $g^{th}$ stages ST9 to STg.

Therefore, in the first frame, the eight real gate clocks RCLK1 to RCLK8 having different phases can be sequentially supplied to eight adjacent stages (for example, the first to eighth stages ST1 to ST8).

Moreover, in the second frame, the four black gate clocks BCLK1 to BCLK4 having the first phase can be sequentially supplied to four adjacent stages (for example, the first to fourth stages ST1 to ST4), and the four black gate clocks BCLK5 to BCLK8 having the second phase can be sequentially supplied to four adjacent stages (for example, the fifth to eighth gate clocks CLK5 to CLK8).

Finally, a gate pulse output from an $n^{th}$ (where n is a natural number) can be supplied to an $n+4^{th}$ stage and can turn on the start transistor Tst included in the $n+4^{th}$ stage.

For example, as illustrated in FIG. 6, a first gate pulse output from the first stage ST1 can be supplied to the fifth stage ST5, and a second gate pulse output from the second stage ST2 can be supplied to the sixth stage ST6.

Based on the above-described principle, a first dummy gate pulse DGP output from a first dummy stage DST1 can be supplied to the first stage ST1, a second dummy gate pulse DGP output from a second dummy stage DST2 can be supplied to the second stage ST2, a third dummy gate pulse DGP output from a third dummy stage DST3 can be supplied to the third stage ST3, and a fourth dummy gate pulse DGP output from a fourth dummy stage DST4 can be supplied to the fourth stage ST4.

Hereinafter, a driving method of a display apparatus according to the present disclosure will be described with reference to FIGS. 1 to 8.

Figure 8:
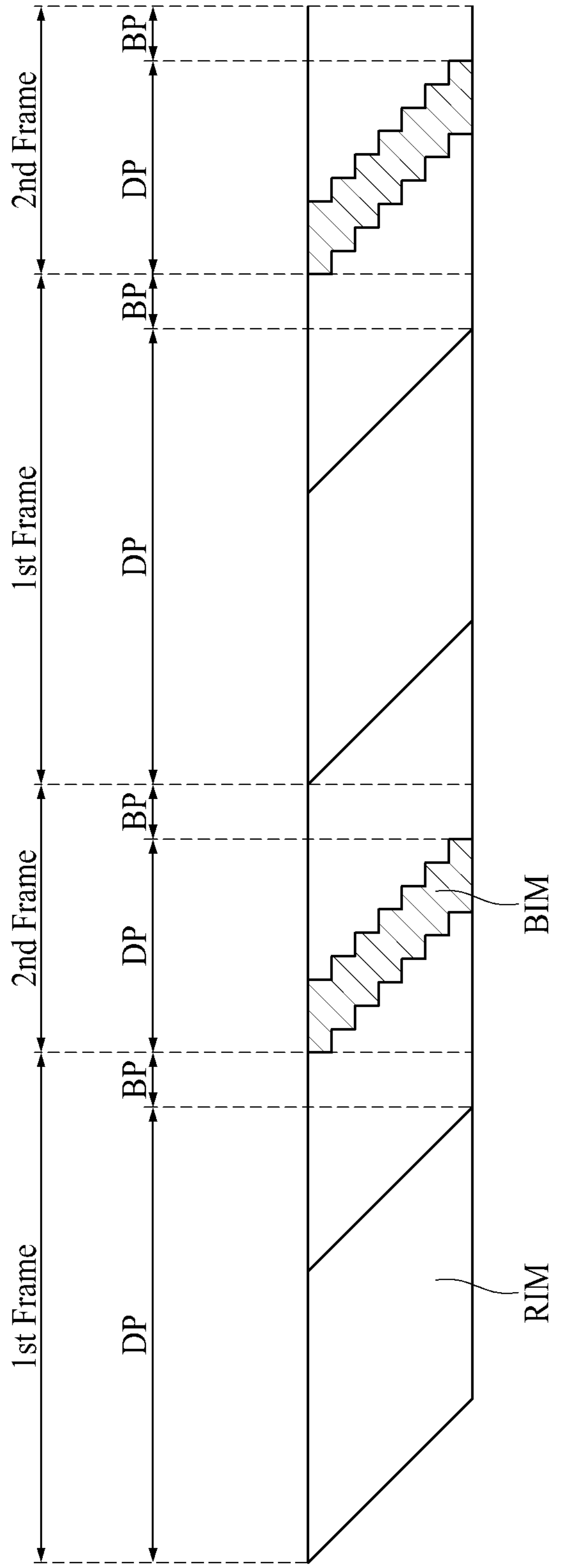
FIG. 8 is an exemplary diagram for describing a driving method of a display apparatus according to the present disclosure.

FIG. 8 is an exemplary diagram for describing a driving method of a display apparatus according to the present disclosure. The driving method of FIG. 8 can be used in each of various display apparatuses according to all embodiments of the present disclosure including the display apparatuses of FIGS. 1-7.

First, when a display period DP of a first frame starts, the control 400 can generate the real gate control signal shown in FIG. 4 and can transfer the real gate control signal to the gate driver 200.

Particularly, the controller 400 can transfer a first real gate start signal RVst1 to the gate driver 200.

The first real gate start signal RVst1 can be simultaneously supplied to the first dummy stage DST1 and the second dummy stage DST2.

Subsequently, the controller 400 can transfer a second real gate start signal RVst2 to the gate driver 200, and the second real gate start signal RVst2 can be simultaneously supplied to the third dummy stage DST3 and the fourth dummy stage DST4.

Moreover, the controller 400 can transfer fifth to eighth dummy gate clocks DG to the first to fourth dummy stages DST1 to DST4 through gate clock lines GCL connected to the first to fourth dummy stages DST1 to DST4. The fifth to eighth dummy gate clocks DG can be the same clocks as the fifth to eighth gate clocks CLK5 to CLK8. However, because the clocks are supplied to the first to fourth dummy stages DST1 to DST4, for convenience, the clocks can be referred to as the fifth to eighth dummy gate clocks DG.

The first to fourth dummy stages DST1 to DST4 can be driven by the first and second real gate start signals RVst1 and RVst2 and the fifth to eighth dummy gate clocks DG, and thus, the first to fourth dummy stages DST1 to DST4 can generate first to fourth dummy gate signals DV1 to DV4.

Particularly, as illustrated in FIG. 6, the dummy gate pulses DGP generated by the first to fourth dummy stages DST1 to DST4 can be supplied to the first to fourth stages ST1 to ST4. Therefore, the first to fourth stages ST1 to ST4 can be driven.

Subsequently, when the first to fourth stages ST1 to ST4 start to be driven, first to fourth real gate clocks RCLK1 to RCLK4 can be supplied to the first to fourth stages ST1 to ST4, and thus, first to fourth gate pulses can be generated by the first to fourth stages ST1 to ST4. The first to fourth gate pulses can be sequentially supplied to first to fourth gate lines, and thus, lights for realizing a real image can be sequentially emitted from pixels connected to the first to fourth gate lines.

Subsequently, the first to fourth gate pulses can be supplied to the fifth to eighth stages ST5 to ST8, and thus, the fifth to eighth stages ST5 to ST8 can be driven.

Subsequently, when the fifth to eighth stages ST5 to ST8 start to be driven, fifth to eighth real gate clocks RCLK5 to RCLK8 can be supplied to the fifth to eighth stages ST5 to ST8, and thus, fifth to eighth gate pulses can be generated by the fifth to eighth stages ST5 to ST8. The fifth to eighth gate pulses can be sequentially supplied to fifth to eighth gate lines, and thus, lights for realizing a real image can be sequentially emitted from pixels connected to the fifth to eighth gate lines.

Subsequently, the following processes can be repeatedly performed in the ninth to $g^{th}$ stages ST9 to STg, and thus, as shown in FIG. 8, a real image RIM can be displayed in the display period DP.

Subsequently, when the display period DP elapses, a blank period BP of the first frame can start. In the blank period BP, real data voltages may not be supplied to the data lines DL1 to DLd. However, the real image RIM displayed in the display period DP can be continuously displayed through the display panel 100.

Subsequently, when the blank period BP of the first frame elapses, a blank period DP of the second frame can start.

When the display period DP of the second frame starts, the controller 400 can generate a black gate control signal shown in FIG. 5 and can transfer the black gate control signal to the gate driver 200.

Particularly, the controller 400 can transfer a first black gate start signal BVst1 to the gate driver 200.

The first black gate start signal BVst1 can be simultaneously supplied to the first dummy stage DST1 and the second dummy stage DST2.

Subsequently, the controller 400 can transfer a second black gate start signal BVst2 to the gate driver 200, and the second black gate start signal BVst2 can be simultaneously supplied to the third dummy stage DST3 and the fourth dummy stage DST4.

Moreover, the controller 400 can transfer the fifth to eighth dummy gate clocks DG to the first to fourth dummy stages DST1 to DST4 through the gate clock lines GCL connected to the first to fourth dummy stages DST1 to DST4. As described above, the fifth to eighth dummy gate clocks DG can be the same clocks as the fifth to eighth gate clocks CLK5 to CLK8.

The first to fourth dummy stages DST1 to DST4 can be driven by the first and second black gate start signals BVst1 and BVst2 and the fifth to eighth dummy gate clocks DG, and thus, the first to fourth dummy stages DST1 to DST4 can generate the first to fourth dummy gate signals DV1 to DV4.

Particularly, as illustrated in FIG. 6, the dummy gate pulses DGP generated by the first to fourth dummy stages DST1 to DST4 can be supplied to the first to fourth stages ST1 to ST4. Therefore, the first to fourth stages ST1 to ST4 can be driven.

In this case, as shown in FIG. 5, the first and second black gate start signals BVst1 and BVst2 can have the same phase, and the fifth to eighth dummy gate clocks DG can have the same phase.

Therefore, the dummy gate pulses DGP generated by the first to fourth dummy stages DST1 to DST4 can have the same phase. Accordingly, the first to fourth dummy stages DST1 to DST4 can be driven at the same timing.

Subsequently, when the first to fourth stages ST1 to ST4 start to be driven, the first to fourth black gate clocks BCLK1 to BCLK4 can be supplied to the first to fourth stages ST1 to ST4, and thus, the first to fourth stages ST1 to ST4 can generate first to fourth gate pulses.

In this case, as shown in FIG. 5, phases of the first to fourth black gate clocks BCLK1 to BCLK4 can be the same. Accordingly, the first to fourth stages ST1 to ST4 can output the first to fourth gate pulses having the same phase.

Therefore, the first to fourth gate pulses can be simultaneously supplied to first to fourth gate lines, and thus, pixels connected to the first to fourth gate lines can simultaneously emit lights for realizing a black image.

The controller 400 can supply the data driver with pieces of black image data stored in the controller 400 or a separate storage unit, based on a timing at which the first to fourth gate pulses are simultaneously supplied to the first to fourth gate lines. The data driver 300 can convert the pieces of black image data into black data voltages and can supply the black data voltages to the data lines DL1 to DLd on the basis of a timing at which the first to fourth gate pulses are simultaneously supplied to the first to fourth gate lines.

Therefore, the pixels connected to the first to fourth gate lines can simultaneously emit black lights corresponding to the black image.

Subsequently, the first to fourth gate pulses can be simultaneously supplied to the fifth to eighth stages ST5 to ST8, and thus, the fifth to eighth stages ST5 to ST8 can be simultaneously driven.

Subsequently, when the fifth to eighth stages ST5 to ST8 start to be driven, the fifth to eighth black gate clocks BCLK5 to BCLK8 can be supplied to the fifth to eighth stages ST5 to ST8, and thus, the fifth to eighth stages ST5 to ST8 can generate fifth to eighth gate pulses.

In this case, as shown in FIG. 5, phases of the fifth to eighth black gate clocks BCLK5 to BCLK8 can be the same. Accordingly, the fifth to eighth stages ST5 to ST8 can output the fifth to eighth gate pulses having the same phase.

Therefore, the fifth to eighth gate pulses can be simultaneously supplied to fifth to eighth gate lines, and thus, pixels connected to the fifth to eighth gate lines can simultaneously emit lights for realizing a black image.

The controller 400 can supply the data driver with pieces of black image data stored in the controller 400 or a separate storage unit, based on a timing at which the fifth to eighth gate pulses are simultaneously supplied to the fifth to eighth gate lines. The data driver 300 can convert the pieces of black image data into black data voltages and can supply the black data voltages to the data lines DL1 to DLd on the basis of a timing at which the fifth to eighth gate pulses are simultaneously supplied to the fifth to eighth gate lines.

Therefore, the pixels connected to the fifth to eighth gate lines can simultaneously emit black lights corresponding to the black image.

Subsequently, the above-described processes can be repeatedly performed in the ninth to $g^{th}$ stages ST9 to STg, and thus, as shown in FIG. 8, a black image BIM can be displayed in the display period DP.

Particularly, in the display period DP of the second frame, as described above, gate pulses can be simultaneously supplied to four adjacent gate lines. Therefore, as described above, the display period DP of the second frame can decrease compared to the display period DP of the first frame, and particularly, can decrease to ¼ of the display period DP of the first frame.

Subsequently, when the display period DP elapses, a blank period BP of the second frame can start. In the blank period BP, black data voltages may not be supplied to the data lines DL1 to DLd. However, the black image BIM displayed in the display period DP can be continuously displayed through the display panel 100.

Finally, the first frame and the second frame can be alternately generated, and thus, the real image RIM and the black image BIM can be alternately displayed through the display panel 100.

Hereinafter, the effects and features of the present disclosure will be described with reference to FIGS. 1 to 9.

Figure 9:
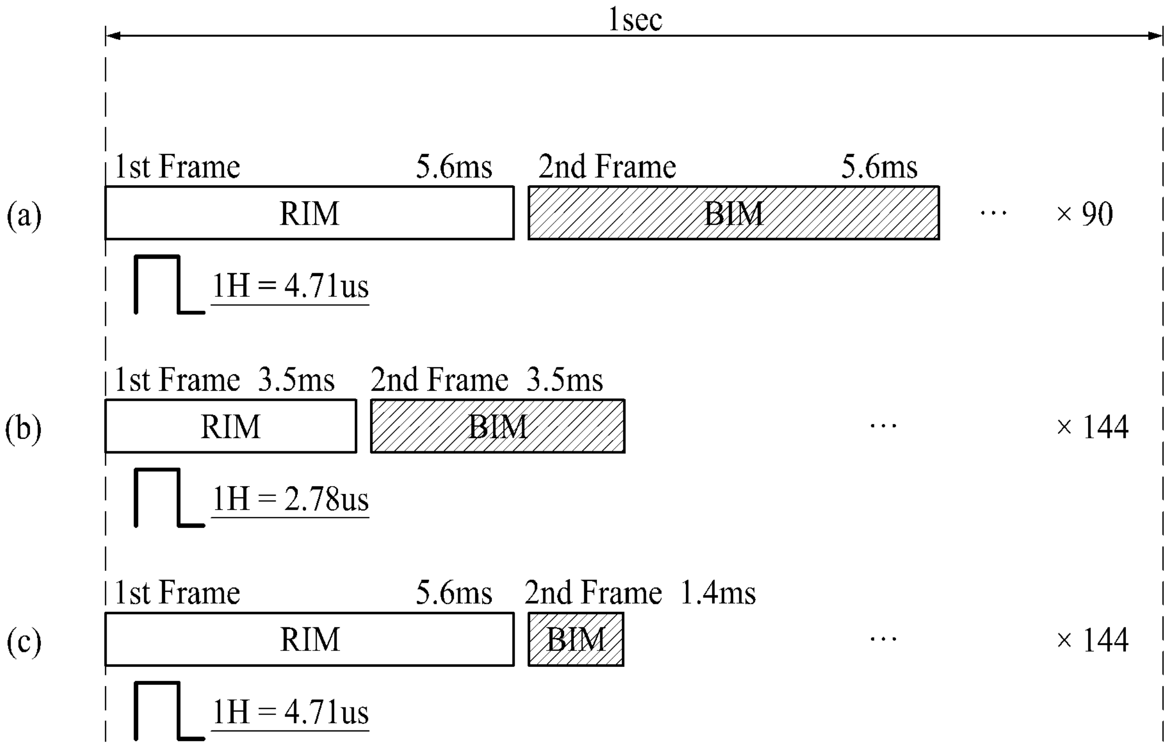
FIG. 9 is an exemplary diagram for describing an effect of a display apparatus according to the present disclosure.

FIG. 9 is an exemplary diagram for describing an effect of a display apparatus according to the present disclosure. Particularly, (a) of FIG. 9 is an exemplary diagram illustrating a method of driving a real image RIM and a black image BIM at 180 Hz, (b) of FIG. 9 is an exemplary diagram illustrating a method of driving a real image RIM and a black image BIM at 288 Hz, and (c) of FIG. 9 is an exemplary diagram illustrating a method of driving a real image RIM and a black image BIM in different periods. A display apparatus according to the present disclosure can be driven based on the method illustrated in (c) of FIG. 9.

In the method illustrated in (a) of FIG. 9, the real image RIM and the black image BIM are driven at 180 Hz. Therefore, the real image RIM is displayed 90 times for one second, and moreover, the black image BIM is displayed 90 times for one second.

In this case, a period of a first frame (a one-frame period) where the real image RIM is displayed is 5.6 ms, and a period of a second frame (a one-frame period) where the black image BIM is displayed is 5.6 ms. Accordingly, a one-horizontal period for displaying the real image RIM or the black image BIM is 4.71 □.

In the method illustrated in (b) of FIG. 9, the real image RIM and the black image BIM are driven at 288 Hz. Therefore, the real image RIM is displayed 144 times for one second, and moreover, the black image BIM is displayed 144 times for one second.

In this case, a period of a first frame (a one-frame period) where the real image RIM is displayed is 3.5 ms, and a period of a second frame (a one-frame period) where the black image BIM is displayed is 3.5 ms. Accordingly, a one-horizontal period for displaying the real image RIM or the black image BIM is 2.78 □.

In the present disclosure illustrated in (c) of FIG. 9, the real image RIM is driven at a speed corresponding to 180 Hz, and the black image BIM is driven at a speed which is four times higher than 180 Hz. In this case, when the real image RIM and the black image BIM are regarded as one image, the one image is driven at 288 Hz like the real image RIM and the black image BIM shown in (b) of FIG. 9.

Therefore, the real image RIM is displayed 144 times for one second, and moreover, the black image BIM is displayed 144 times for one second.

However, in the present disclosure illustrated in (c) of FIG. 9, a period of a first frame (a one-frame period) where the real image RIM is displayed is 5.6 ms, and a period of a second frame (a one-frame period) where the black image BIM is displayed is 1.4 ms.

Therefore, a one-horizontal period for displaying the real image RIM is 4.71 □, and a one-horizontal period for displaying the black image BIM corresponds to ¼ of 4.71 □.

First, a result obtained by comparing the method described above with reference to (a) of FIG. 9 with the present disclosure described above with reference to (c) of FIG. 9 will be described below.

Each of a one-horizontal period 1H based on the method described above with reference to (a) of FIG. 9 and a one-horizontal period 1H based on the present disclosure described above with reference to (c) of FIG. 9 is 4.71 □. Therefore, a period where a data voltage is charged into a pixel by the present disclosure described above with reference to (c) of FIG. 9 can be the same a period where a data voltage is charged into a pixel by the method described above with reference to (a) of FIG. 9. Accordingly, according to the present disclosure, the same one-horizontal period 1H as a one-horizontal period 1H where a data voltage is charged into a pixel in a display apparatus substantially driven at 180 Hz can be secured. For example, in (a) of FIG. 9, each frame can be driven at 180 Hz, but real images RIM can be displayed 90 times for one second. Also, in the present disclosure described above with reference to (c) of FIG. 9, real images RIM can have the same frame period as that of each real image RIM shown in (a) of FIG. 9. Accordingly, according to the present disclosure, real images RIM can be driven by substantially the same method as a method of driving a real image at 180 Hz.

In this case, according to the method described above with reference to (a) of FIG. 9, 90 real images can be displayed for one second, but according to the present disclosure described above with reference to (c) of FIG. 9, 144 real images can be displayed for one second. Accordingly, according to the present disclosure described above with reference to (c) of FIG. 9, image quality can be enhanced.

For example, the present disclosure described above with reference to (c) of FIG. 9 can secure the same one-horizontal period 1H as a one-horizontal period 1H based on the method described above with reference to (a) of FIG. 9 and can provide image quality which is better than image quality provided by the method described above with reference to (a) of FIG. 9.

Second, a result obtained by comparing the method described above with reference to (b) of FIG. 9 with the present disclosure described above with reference to (c) of FIG. 9 will be described below.

A one-horizontal period 1H based on the method described above with reference to (b) of FIG. 9 can be 2.78 □, and a one-horizontal period 1H based on the present disclosure described above with reference to (c) of FIG. 9 can be 4.71 □. Therefore, a period where a data voltage is charged into a pixel by using the present disclosure described above with reference to (c) of FIG. 9 can be longer than a period where a data voltage is charged into a pixel by using the method described above with reference to (b) of FIG. 9. Accordingly, according to the present disclosure, a one-horizontal period 1H can be sufficiently secured.

In this case, according to the method described above with reference to (b) of FIG. 9, 144 real images can be displayed for one second, but according to the present disclosure described above with reference to (c) of FIG. 9, 144 real images can be displayed for one second.

Therefore, the present disclosure described above with reference to (c) of FIG. 9 can provide the same image quality as image quality provided by the method described above with reference to (b) of FIG. 9.

For example, the present disclosure described above with reference to (c) of FIG. 9 can secure a one-horizontal period 1H which is longer than a one-horizontal period 1H based on the method described above with reference to (b) of FIG. 9 and can provide the same image quality as image quality provided by the method described above with reference to (b) of FIG. 9.

Hereinafter, the features of the present disclosure described above will be briefly described.

A display apparatus according to the present disclosure can be implemented to realize a high resolution and high-speed driving, and thus, a one-horizontal period can be progressively shortened for implementing a number of frames for a certain time. However, as a one-horizontal period is shortened, a period where a data voltage is charged into a pixel can be shortened, and thus, an image may not be normally displayed. The present disclosure is proposed for solving the problems.

For example, according to the present disclosure, a black image can be inserted between real images, thereby enhancing the quality of images.

Particularly, according to the present disclosure, a one-frame period where a black image is displayed can be shorter than a one-frame period where a real image is displayed, and thus, a one-horizontal period of a real image can be sufficiently secured.

To this end, according to the present disclosure, eight gate clocks used to display a real image can be grouped into two groups and driven while a black image is being displayed. Accordingly, a one-frame period where a black image is displayed can be ¼ of a one-frame period where a real image is displayed, and an interval between periods for displaying real images can be reduced, whereby a display apparatus can be driven at a high speed.

For example, according to the present disclosure, in frames where a black image is displayed, eight gate clocks used to display a real image can be grouped into two groups and can simultaneously drive four gate clocks, and a black image can be inserted between real images. Thus, according to the present disclosure, a one-frame period where a black image is displayed can decrease to ¼ of a one-frame period where a real image is displayed, and a one-frame period where a data voltage is charged into a pixel can be sufficiently secured.

Therefore, the present disclosure can be effectively applied to a display apparatus which realizes a high resolution and is driven at a high speed.

In the present disclosure, a black image can be provided between real images, and one frame period for displaying the black image is set to be shorter than one frame period where each of the real images is displayed.

Therefore, according to the present disclosure, the one-horizontal period for displaying the real images can be sufficiently secured, and a display apparatus can be driven at a high speed.

Particularly, in the present disclosure, black lights can be simultaneously emitted from two or more horizontal lines, and thus, the one frame period for displaying the black image can be shortened. Accordingly, the display apparatus can be driven at a high speed.

The above-described features, structures, and effects of the present disclosure are included in at least one embodiment of the present disclosure, but are not limited to only one embodiment. Furthermore, the features, structures, and effects described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:

a display panel configured to display a black image and a real image;

a gate driver configured to display gate signals to a plurality of gate lines provided in a display area of the display panel; and a controller configured to control the gate driver, wherein a one-frame period for displaying the black image is shorter than a one-frame period where the real image is displayed, wherein the gate driver comprises:

a plurality of stages configured to supply the gate signals to the plurality of gate lines; and a plurality of dummy stages connected directly between the plurality of stages and the controller, wherein gate start signals for driving the plurality of stages are supplied to the plurality of dummy stages by the controller, wherein in the gate start signals, each of a first real gate start signal and a second real gate start signal is included in a real gate control signal transferred to the gate driver in a first frame, wherein in the gate start signals, each of a first black gate start signal and a second black gate start signal is included in a black gate control signal transferred to the gate driver in a second frame, and wherein the first black gate start signal and the second black gate start signal are simultaneously supplied to the first to fourth dummy stages.

2. The display apparatus of claim 1, wherein in the first frame where the real image is displayed, the controller transfers the real gate control signal to the gate driver, and in the second frame where the black image is displayed, the controller transfers the black gate control signal to the gate driver.

3. The display apparatus of claim 2, wherein a width of a real gate clock included in the real gate control signal is greater than a width of a black gate clock included in the black gate control signal.

4. The display apparatus of claim 3, wherein the width of the real gate clock corresponds to m/2-horizontal to m-horizontal periods where m is a natural number, and the width of the black gate clock is equal to or greater than an m/4-horizontal period and is less than the width of the real gate clock.

5. The display apparatus of claim 3, wherein the real gate control signal comprises a plurality of real gate clocks having different phases.

6. The display apparatus of claim 5, wherein the black gate control signal comprises a plurality of black gate clocks having a first phase and a plurality of black gate clocks having a second phase which differs from the first phase.

7. The display apparatus of claim 1, wherein each of the first real gate start signal and the second real gate start signal has a width corresponding to a four-horizontal period, and each of the first black gate start signal and the second black gate start signal has a width corresponding to a one-horizontal period.

8. The display apparatus of claim 7, wherein the first real gate start signal is supplied to a first dummy stage and a second dummy stage among four dummy stages, and the second real gate start signal is supplied to a third dummy stage and a fourth dummy stage among the four dummy stages.

9. The display apparatus of claim 7, wherein a phase of the first real gate start signal differs from a phase of the second real gate start signal, and a phase of the first black gate start signal is the same as a phase of the second black gate start signal.

10. The display apparatus of claim 7, wherein the real gate control signal comprises eight real gate clocks having different phases, and the black gate control signal comprises four black gate clocks having a first phase and four black gate clocks having a second phase which differs from the first phase.

11. The display apparatus of claim 10, wherein the eight real gate clocks are sequentially supplied to eight adjacent stages, the four black gate clocks having the first phase are simultaneously supplied to four adjacent stages, and the four black gate clocks having the second phase are simultaneously supplied to four adjacent stages.

12. A display apparatus comprising:

a display panel configured to display a black image and a real image;

a gate driver configured to display gate signals to a plurality of gate lines provided in a display area of the display panel; and a controller configured to control the gate driver, wherein a one-frame period for displaying the black image is shorter than a one-frame period where the real image is displayed, wherein the gate driver comprises:

a plurality of stages configured to supply the gate signals to the plurality of gate lines; and a plurality of dummy stages connected to the controller, wherein gate start signals for driving the plurality of stages are supplied to the plurality of dummy stages by the controller, wherein in the gate start signals, each of a first real gate start signal and a second real gate start signal included in a real gate control signal transferred to the gate driver in the first frame has a width corresponding to a four-horizontal period, wherein in the gate start signals, each of a first black gate start signal and a second black gate start signal included in a black gate control signal transferred to the gate driver in the second frame has a width corresponding to a one-horizontal period, wherein the first real gate start signal is supplied to a first dummy stage and a second dummy stage among four dummy stages, wherein the second real gate start signal is supplied to a third dummy stage and a fourth dummy stage among the four dummy stages, and wherein the first black gate start signal and the second black gate start signal are simultaneously supplied to the first to fourth dummy stages.

13. A display apparatus comprising:

a display panel configured to display a black image and a real image;

a gate driver configured to display gate signals to a plurality of gate lines provided in a display area of the display panel; and a controller configured to control the gate driver, wherein a one-frame period for displaying the black image is shorter than a one-frame period where the real image is displayed, wherein the gate driver comprises:

a plurality of gate start signal lines;

a plurality of stages configured to supply the gate signals to the plurality of gate lines; and a plurality of dummy stages unconnected to the plurality of gate lines, wherein gate start signals for driving the plurality of stages are supplied to the plurality of dummy stages by the controller, via the plurality of gate start signal lines, and wherein a first dummy stage among the plurality of dummy stages is directly connected to a first gate start signal line among the plurality of gate start signal lines, and a second dummy stage among the plurality of dummy stages is directly connected to a second gate start signal line among the plurality of gate start signal lines.

14. The display apparatus of claim 13, wherein none of the plurality of stages is directly connected to the plurality of gate start signal lines.

15. The display apparatus of claim 13, wherein in a first frame where the real image is displayed, the controller transfers a real gate control signal to the gate driver, and in a second frame where the black image is displayed, the controller transfers a black gate control signal to the gate driver.

16. The display apparatus of claim 15, wherein a width of a real gate clock included in the real gate control signal is greater than a width of a black gate clock included in the black gate control signal.

17. The display apparatus of claim 13, wherein in the gate start signals, each of a first real gate start signal and a second real gate start signal included in a real gate control signal transferred to the gate driver in the first frame has a width corresponding to a four-horizontal period, and in the gate start signals, each of a first black gate start signal and a second black gate start signal included in a black gate control signal transferred to the gate driver in the second frame has a width corresponding to a one-horizontal period.

* * * * *